United States Patent [19]

Gallacher

[11] Patent Number: 5,625,657
[45] Date of Patent: Apr. 29, 1997

[54] METHOD OF REPAIRING A NUCLEAR FUEL ROD ASSEMBLY WITH DAMAGED FUEL ROD AND A DAMAGED SPACER

[75] Inventor: Vincent N. Gallacher, Kennewick, Wash.

[73] Assignee: Siemens Power Corporation, Richland, Wash.

[21] Appl. No.: 414,065

[22] Filed: Mar. 31, 1995

[51] Int. Cl.$^6$ .................................................. G21C 19/02
[52] U.S. Cl. ........................... 376/261; 376/438; 376/442
[58] Field of Search ................................... 376/261, 438, 376/439, 441, 442, 446, 260

[56] References Cited

U.S. PATENT DOCUMENTS

| | | | |
|---|---|---|---|
| 4,416,852 | 11/1983 | Nylund | 376/438 |
| 4,576,786 | 3/1986 | DeMario | 376/439 |
| 4,726,926 | 2/1988 | Patterson et al. | 376/439 |
| 4,756,878 | 7/1988 | King et al. | 376/439 |
| 4,784,825 | 11/1988 | Busselman et al. | 376/438 |
| 4,814,138 | 3/1989 | Fick et al. | 376/446 |
| 4,968,477 | 11/1990 | Savinell et al. | 376/261 |
| 4,988,474 | 1/1991 | Hoffmann et al. | 376/261 |
| 5,084,237 | 1/1992 | Patterson et al. | 376/442 |
| 5,245,644 | 9/1993 | Büttner et al. | 376/442 |

FOREIGN PATENT DOCUMENTS

| | | | |
|---|---|---|---|
| 0146896 | 7/1985 | European Pat. Off. | |
| 0493259A1 | 7/1992 | European Pat. Off. | |
| 0493259 | 7/1992 | European Pat. Off. | 376/260 |
| 2618014 | 1/1989 | France | |
| 2633436 | 12/1989 | France | |

OTHER PUBLICATIONS

Kerntechnik, vol. 56, No. 2, 1 Apr. 1991, pp. 68–71, XP000214534; Knecht K J et al: "New Techniques For Investigation And Reconstitution Of Fuel Elements", pp. 69–71.

*Primary Examiner*—Harvey E. Behrend
*Attorney, Agent, or Firm*—Ira Lee Zebrak

[57] ABSTRACT

A method of repairing a nuclear fuel rod assembly having a damaged fuel rod and/or a damaged spacer cell.

12 Claims, 6 Drawing Sheets

METHOD OF REPAIRING A NUCLEAR FUEL ROD ASSEMBLY WITH DAMAGED FUEL ROD AND A DAMAGED SPACER

FIELD OF THE INVENTION

The present invention relates generally to fuel assemblies for nuclear reactors and, more particularly to a method of repairing a nuclear fuel assembly having a damaged fuel rod and/or a damaged spacer.

BACKGROUND

In a nuclear reactor, the reactor core contains nuclear fuel which is typically in the form of fuel rods grouped together in fuel assemblies. Groups of fuel assemblies are arranged into a matrix to form a core capable of controlled fission reaction. Each fuel rod is typically a long member approximately 0.4 inches in diameter and 8 to 15 feet long containing fuel usually in the form of a stack of fuel pellets which are surrounded by tubular cladding. The fuel rods which make up an assembly are grouped together to form a plurality of longitudinally extending members which are supported by two parallel end plates, an upper and a lower tie plate. These plates are usually connected to one another by tie rods, or other structural elements.

Each fuel assembly may also include non-fuel bearing members. Examples include guide tubes to form passageways for control rods which assist in controlling the rate of fission, instrumentation tubes for in-core instrumentation, spacer capture rods, and water rods to modify the neutron moderation in the assembly. The spaces between adjacent fuel rods create flow channels through which coolant and/or moderator can circulate. In light water reactors, the coolant and moderator is water. Lateral bracing and spacing of the fuel rods in the fuel assembly are provided by spacers or spacer grids.

The fuel assembly functions in part to maintain the fuel rods in a fixed position, ideally free of vibration and restrained from bowing or other lateral displacement during normal and other operating conditions. In addition, by maintaining the fuel rods in fixed positions, proper cooling and neutron moderation can be achieved. Devices that assist in maintaining the fuel rods in fixed positions in the fuel assembly and which thereby facilitate proper fuel cooling are spacers.

Spacers or spacer grids which provide lateral bracing are typically designed to allow differential axial expansion of the fuel rods. Springs incorporated in the spacer grids are most frequently used to permit some sliding of the fuel rods with respect to the spacer grids. In some of the designs, the spacer grid is free to move axially a small amount to accommodate minor changes in the axial length of the fuel rods during irradiation. By being positioned at regular intervals, spacers maintain rod-to-rod spacing along the length of the fuel assembly.

As is well known, spacer grids are generally built up from a relatively large number of different intricately shaped strips that are fitted together to form spacer cells and subsequently welded. Each spacer cell typically includes dimples and/or springs to maintain the desired rod-to-rod spacing. Thus, such springs and dimples keep the fuel rods in their proper lateral positions. But, under the influence of radiation, the springs are prone to relax and this can lead to undesirable changes in fuel rod pitch (i.e. rod-to-rod spacing) or it may cause gaps or spaces to develop between fuel rods and the springs and dimples, and increases the likelihood that the rods and/or spacer grids will vibrate. Such gaps, changes in fuel rod pitch, and vibration may lead to fuel rod fretting and failure. Damage to spacer springs or dimples during the manufacture of fuel assemblies or damage during subsequent handling operations increase the likelihood of fuel rod fretting failures. Furthermore, as the fuel is irradiated, the fuel rods undergo a shrinkage or diameter reduction known as "creepdown" which can result in gaps between the fuel rod cladding and the springs or dimples which in turn can cause or contribute to fuel rod fretting.

Fuel assemblies which experienced fuel rod fretting failures due to damaged spacer cells have required various repairs to return the fuel assembly to service. Previous repair methods, including special replacement fuel rod designs or side insertable springs or clips required significant engineering, testing, and licensing work in order to provide an adequate repair of the fuel assembly. These repair devices are usually produced on a case by case basis. Accordingly, their feasibility and functionability must be established for each application.

It would be an advantage over the prior art to utilize a method which will eliminate a substantial amount of engineering and licensing work required by simplifying the above-described prior art repair methods and repair apparatuses.

SUMMARY OF THE INVENTION

In accordance with one aspect of the invention, a method is provided for repairing a nuclear fuel rod assembly having a plurality of spaced apart grid spacers comprising an arrangement of a first plurality of grid strips intersecting each other to form a first plurality of spacer cells through which fuel rods extend and for maintaining the fuel rods in a predetermined position within said assembly, an upper tie plate located at the top of said assembly, and a grid spacer having a damaged spacer cell, the method comprising the steps of: removing the upper tie plate from the nuclear fuel rod assembly; pulling a fuel rod passing through the damaged spacer cell upward to slide it through the grid spacer having the damaged spacer cell to expose an underside of the damaged grid spacer; pulling a plurality of fuel rods at least some of which are adjacent to the fuel rod formerly passing through the damaged spacer cell upward to slide them through the grid spacer having the damaged spacer cell to further expose the underside of the damaged grid spacer; positioning a repair grid into the nuclear fuel rod assembly and holding the repair grid against the underside of the damaged grid spacer at the damaged spacer cell, the repair grid comprising a second plurality of grid strips intersecting each other to form a second plurality of spacer cells for maintaining the fuel rod which passes through the damaged spacer cell and at least some of the fuel rods adjacent to the fuel rod which passes through the damaged spacer cell in the predetermined position within the nuclear fuel rod assembly, the repair grid substantially duplicating a portion of the arrangement of the first plurality of grid strips intersecting each other to form the first plurality of spacer cells of the grid spacer having the damaged spacer cell; sliding the fuel rod formerly passing through the damaged spacer cell back into the damaged spacer cell and grid spacer cells formerly occupied by it and into a corresponding one of the second plurality of spacer cells of the repair grid to support in the repair grid said fuel rod passing through the damaged spacer cell; sliding the plurality of fuel rods at least some of which are adjacent to the fuel rod passing through the damaged spacer cell back into the spaces and grid spacer locations formerly occupied by them and into respective corresponding ones of the second plurality of spacer cells of the repair grid to support the plurality of fuel rods at least some of which are adjacent to the fuel rod passing through the damaged spacer cell; and replacing the upper tie plate to said fuel rod assembly.

DETAILED DESCRIPTION

Figure 1:
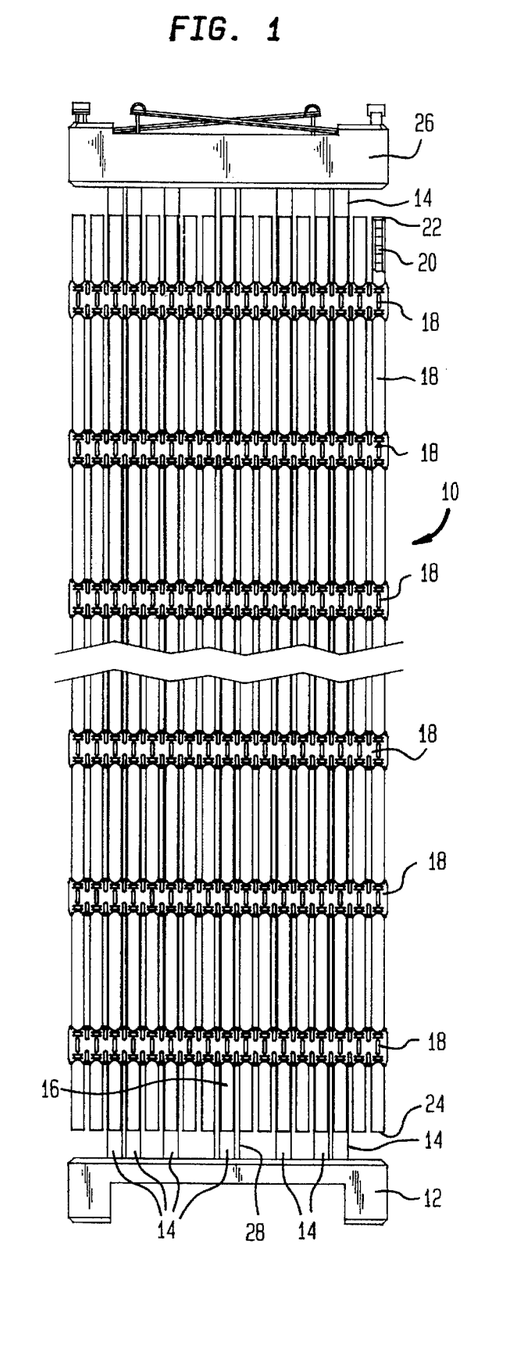
FIG. 1 is a side elevational view of a nuclear fuel assembly for a pressurized water reactor.

FIG. 1 represents a pressurized water reactor (PWR) nuclear fuel assembly 10 comprising a lower tie plate 12, guide tubes 14, fuel rods 16 which are spaced radially and supported by spacer grids 18 spaced along the guide tubes, instrumentation tube 28, and upper tie plate 26 attached to the upper ends of the guide tubes. Although six spacers are shown in FIG. 1 for purposes of illustration, other fuel assembly designs can utilize more or less than that shown. Each fuel rod 16 generally includes nuclear fuel pellets 20 composed of fissionable material and an upper end plug 22 and lower end plug 24 which seal the fuel rod. Water as the coolant/moderator is pumped upwardly through the fuel assembly thereby removing the head generated by the fuel rods. Control rods which are used to assist in controlling the fission reaction are disposed in the guide tubes, but are not shown in this view.

Figure 2:
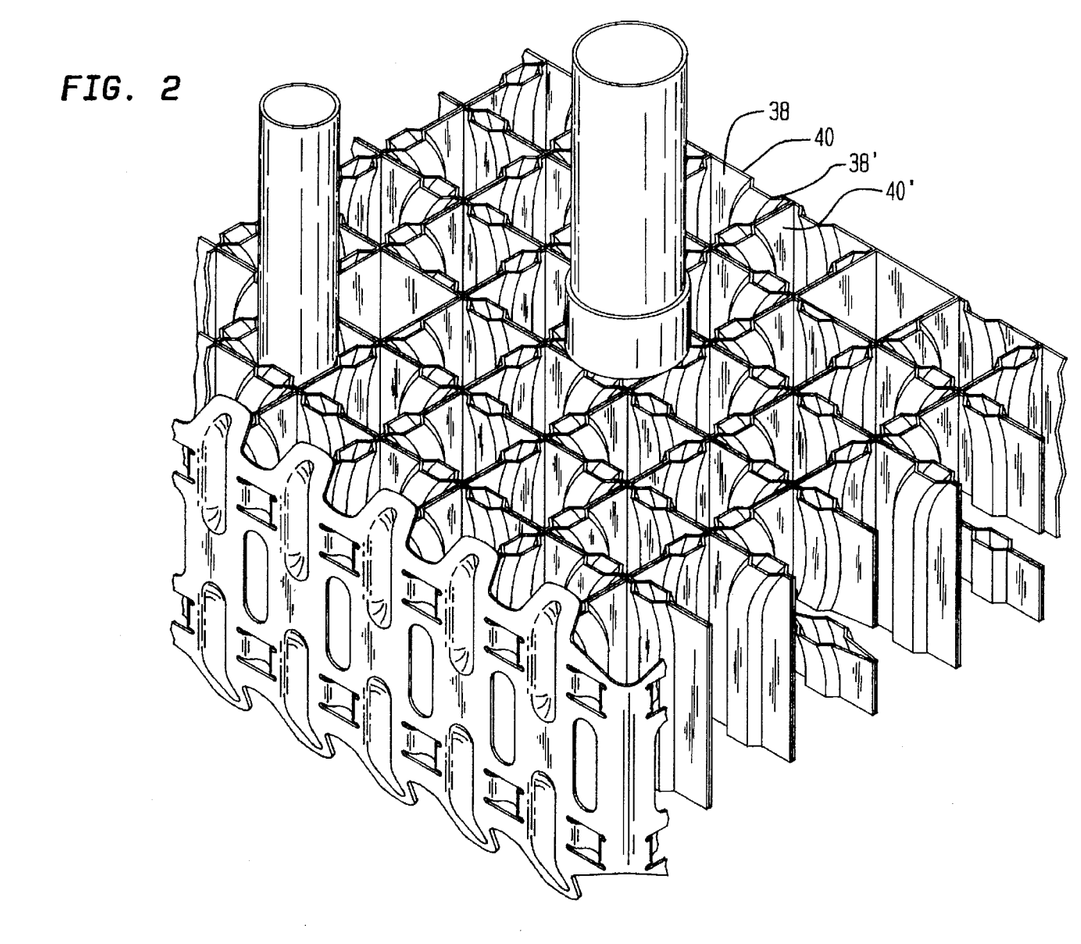
FIG. 2 is a partial perspective view of a spacer grid for the assembly shown in FIG. 1.
Figure 3:
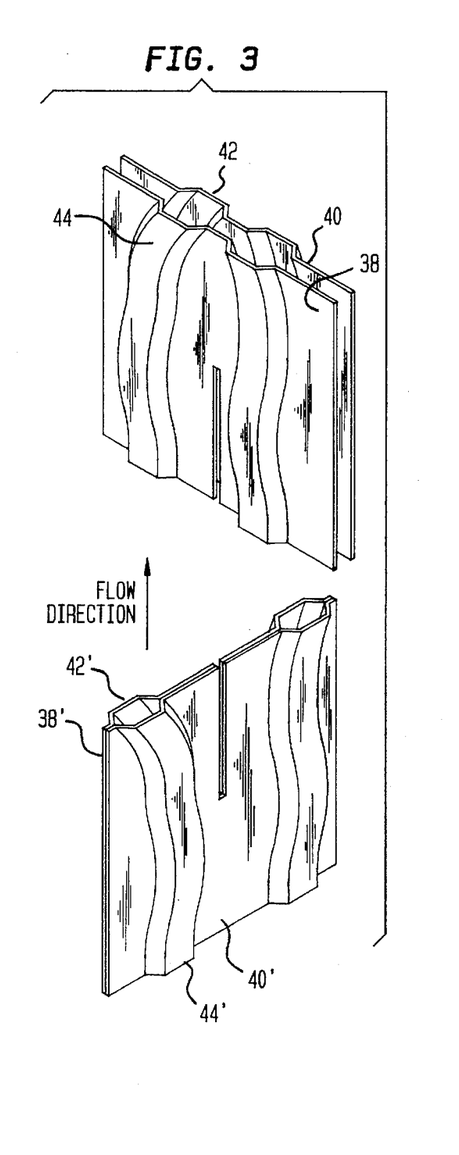
FIG. 3 is a broken view showing the structure of the spacer grid shown in FIG. 2.

The spacers 18 shown in FIG. 1 are the type shown and described in U.S. Pat. No. 4,756,878 issued on Jul. 12, 1988 to King et al. and assigned to the assignee of the present application and which is expressly incorporated by reference. These spacers 18 which are shown in more detail in FIGS. 2 and 3 are of the type depicted in FIGS. 6 and 7 of U.S. Pat. No. 4,756,878 and show a deflecting-type grid. In this type of spacer grid, the grid members are made up of pairs of strips 38, 40 and 38', 40', which may be welded together at their intersections. These plates are formed with matching channels 42, 44 and 42', 44', which are curved to deflect the cooling fluid as more fully described in U.S. Pat. No. 4,726,926 issued on Feb. 23, 1988 to Patterson et al. and assigned to the assignee of this application, and which is incorporated herein by reference.

Fretting failure of fuel rods in nuclear fuel assemblies can occur due to damaged or weakened springs or dimples or due to excessive component vibrations either in an individual spacer cell or in multiple spacer cells. The vibrations are a result of the hydraulic effects of the coolant flow through the spacer grid or along the fuel rod. The vibration causes relative motion between components or periodic contact between separated surfaces resulting in the rapid material wear.

In accordance with the present invention, a repair grid which acts as an individual but smaller spacer is installed below the affected cell of the damaged spacer. The repair grid comprises a group of spacer cells which duplicate the damaged cell or cells as well as the group of spacer cells adjacent to the damaged cell or cells. The repair grid is positioned within the fuel assembly below the damaged spacer so that the spacer cells of the repair grid are aligned with the spacer cells of the damaged spacer and provide support to both the fuel rod passing through the damaged spacer cell as well as fuel rods which pass through spacer cells adjacent to the damaged spacer cell. If the spacer grid includes springs, further support is provided both by the springs in the repair grid acting upon the fuel rod passing through the damaged cell location as well as by other springs in the repair grid acting upon other fuel rods passing through adjacent undamaged cell locations. Since the repair grid supports both the fuel rod which passes through the damaged spacer cell as well as adjacent fuel rods in undamaged cells of the spacer, incremental support of the fuel rod passing through the damaged spacer cell results.

Figure 4A:
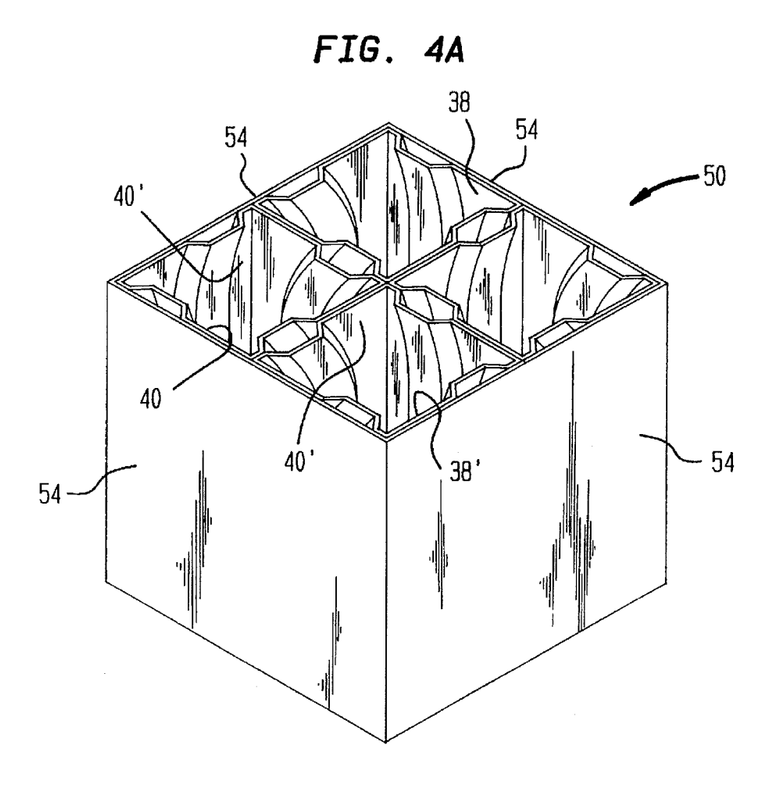
FIG. 4A is a perspective view of a repair grid for the repair of a fuel assembly having a spacer grid damaged in one of its interior spacer cells.
Figure 4B:
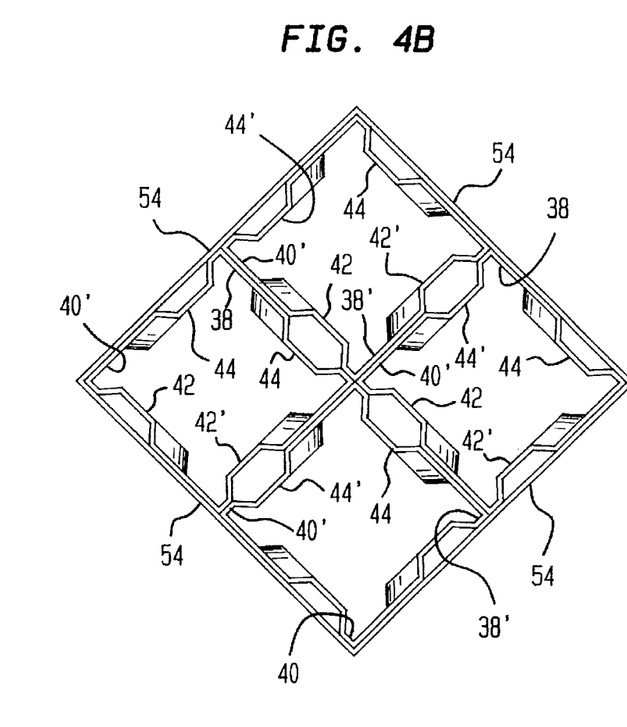
FIG. 4B is a top view of the repair grid shown in FIG. 4A.

Referring to the drawings, FIG. 4A shows a repair grid 50 which comprises a section of spacer 18 which duplicates the spacer cells located in the interior portion of the spacer. FIG. 4B is a top view of repair grid 50 shown in FIG. 4A and shows that it is made up of pairs of grid strips 38, 40 and 38', 40' as spacer grid 18 to form a plurality of spacer cells for maintaining the fuel rods which pass therethrough in predetermined positions as in the grid spacer. Repair grid 50 further includes flat strips 54 which form the outermost walls of the repair grid. Flat strip 54 replaces the outermost strip of each pair of strips and forms the exterior portion of the repair grid. Thus, flat strip 54 replaces: strip 40', from a pair of strips 38', 40'; strip 40 from a pair of strips 38, 40; strip 38' from a pair of strips 38', 40', ; and strip 38 from the last pair of strips 38, 40. These strips are removed and replaced by flat strips 54 to thereby eliminate springs from the external sides of the repair grid in order to eliminate interactions with those fuel rods which will be external to the repair grid once it is installed in the fuel assembly.

Figure 4C:
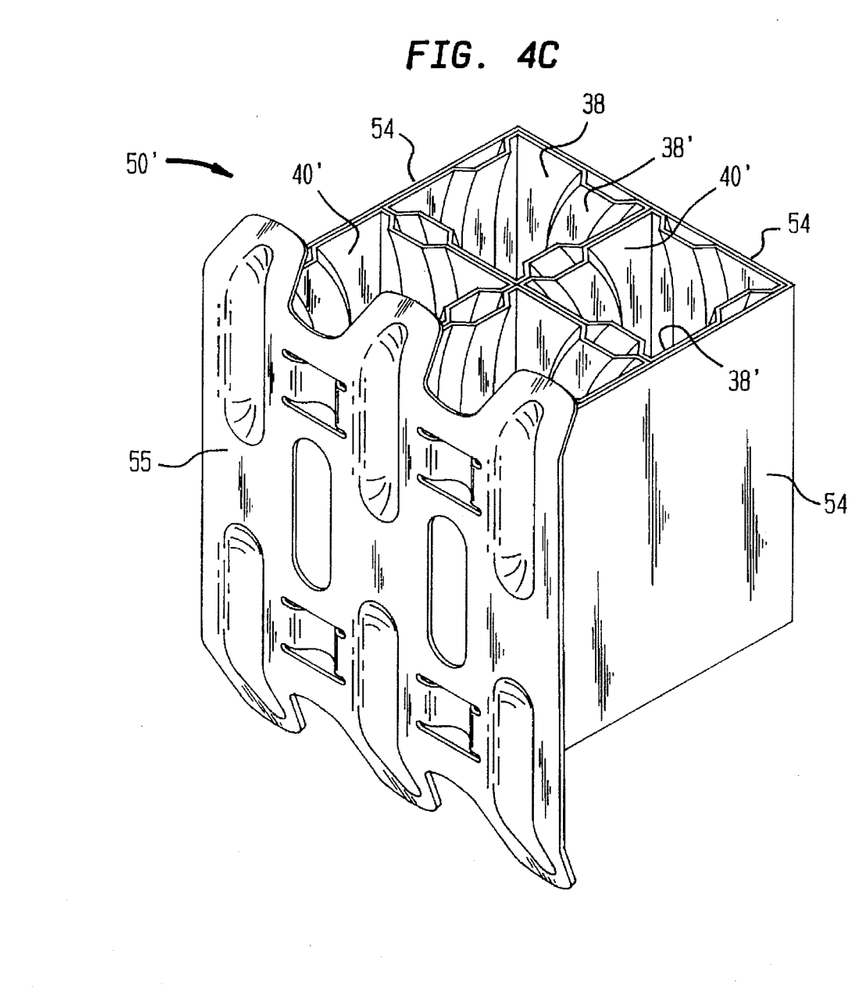
FIG. 4C is a perspective view of a repair grid for the repair of a fuel assembly having a spacer grid damaged in one of its spacer cells positioned along an outer-most edge of the fuel assembly.
Figure 4D:
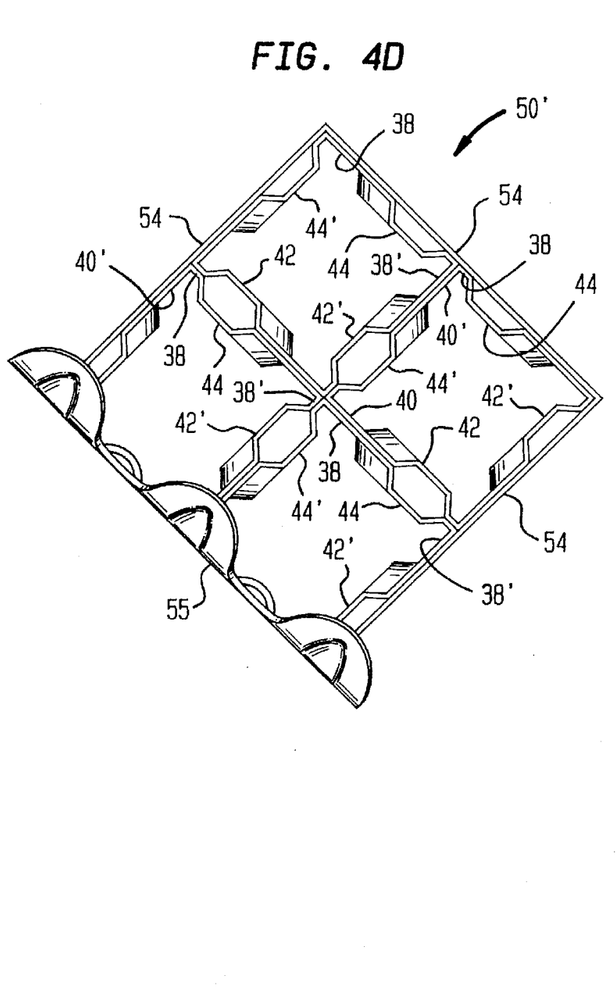
FIG. 4D is a top view of the repair grid shown in FIG. 4C.

FIG. 4C shows a repair grid 50' which comprises a section of spacer cells of spacer 18 positioned on the outermost edge of the spacer at the perimeter of the nuclear fuel rod assembly and is shown in this embodiment to include two peripheral cells of the grid spacer. Repair grid 50' is made up of pairs of strips 38, 40 and 38', 40' of spacer grid 18 and further includes flat strips 54 which form, in conjunction with perimeter strip 55, the outermost walls of the repair grid. Flat strip 54 replaces the exterior strip of each of the three pairs of strips which make up the repair grid. As shown in FIG. 4D, strip 40' from the pair of strips 38', 40', and strip 40 from the pair of strips 38, 40, and strip 38' from the pair of strips 38', 40' are each replaced by flat strip 54.

Although the repair grids shown in FIGS. 4A, 4B, 4C and 4D are for the particular spacer design shown in FIGS. 1–3, any repair grid which substantially duplicates the spacer cells of a damaged spacer may be used according to the method of the present invention to repair the damaged spacer and provide support to the affected fuel rod(s). Thus, the repair grid design could comprise a square, rectangular or other shaped section of an existing spacer having spacer cells of any regular or irregular polygonal shape through which the fuel rods extend. The repair grid design may be furthermore or alternatively based on a design with integral springs as shown for example in FIGS. 4A, 4B, 4C and 4D or for example with mechanically captured springs such as shown and described in U.S. Pat. No. 5,245,644 issued to B üttner et al. which is hereby incorporated by reference.

The repair of a nuclear fuel rod assembly utilizing the method of the present invention to repair a damaged grid spacer is accomplished by:

(a) removing the upper tie plate from the nuclear fuel rod assembly;

(b) pulling a fuel rod passing through the damaged spacer cell upward to slide it through the grid spacer having the damaged spacer cell to expose an underside of the damaged grid spacer;

(c) pulling other fuel rods some of which are adjacent to the fuel rod formerly passing through the damaged spacer cell upward to slide them through the grid spacer having the damaged spacer cell to further expose the underside of the damaged grid spacer and to permit access through the side of the fuel assembly to the underside of the damaged spacer;

(d) positioning a repair grid which substantially duplicates a portion of the arrangement of grid strips forming the spacer cells of the damaged grid spacer into the fuel rod assembly and holding it against the underside of the damaged grid spacer at the damaged spacer cell;

(e) sliding the fuel rod formerly passing through the damaged spacer cell back into the damaged spacer cell and grid spacer cells formerly occupied by it and into a corresponding spacer cell of the repair grid to support the fuel rod in the repair grid;

(f) sliding the other nuclear fuel rods some of which are adjacent to the fuel rod passing through the damaged spacer cell back into the spaces and grid spacer locations formerly occupied by them and into respective corresponding spacer cells of the repair grid to support these fuel rods in the repair grid; and (g) replacing the upper tie plate to the nuclear fuel rod assembly.

After the repair is completed, the repair grid is held in place by the spring force against the fuel rods and the upward flow of coolant.

If a fuel rod positioned in the damaged spacer cell has failed from fretting, then the failed or damaged fuel rod can be replaced with a new or undamaged rod. The replacement fuel rod may contain modifications to prevent creepdown at the repair grid location. The repair of a damaged nuclear fuel rod assembly utilizing the method of the present invention to replace a damaged fuel rod with a replacement fuel rod and to repair a damaged grid spacer is accomplished by:

(a) removing the upper tie plate from said fuel rod assembly;

(b) pulling the damaged fuel rod passing through the grid structure having the damaged spacer cell upward to slide it out of the grid spacers and out of the nuclear fuel rod assembly;

(c) pulling other fuel rods some of which are adjacent to the damaged fuel rod upward to slide them through the grid spacer having the damaged spacer cell to expose the underside of the damaged grid spacer and to permit access through the side of the fuel assembly to the underside of the damaged spacer;

(d) positioning a repair grid which substantially duplicates a portion of the arrangement of grid strips forming the spacer cells of the damaged grid spacer into the nuclear fuel rod assembly and holding it against the underside of the damaged grid spacer at the damaged spacer cell;

(e) sliding the replacement fuel rod into the space and spacer cell locations formerly occupied by the damaged fuel rod and into a corresponding spacer cell of the repair grid to support the replacement fuel rod in the repair grid;

(f) sliding the other nuclear fuel rods some of which are adjacent to the fuel rod formerly passing through the damaged spacer cell back into the spaces and grid spacer locations formerly occupied by them and into respective corresponding spacer cells of the repair grid to support these fuel rods in the repair grid; and (g) replacing the upper tie plate to said fuel rod assembly.

Figure 5A:
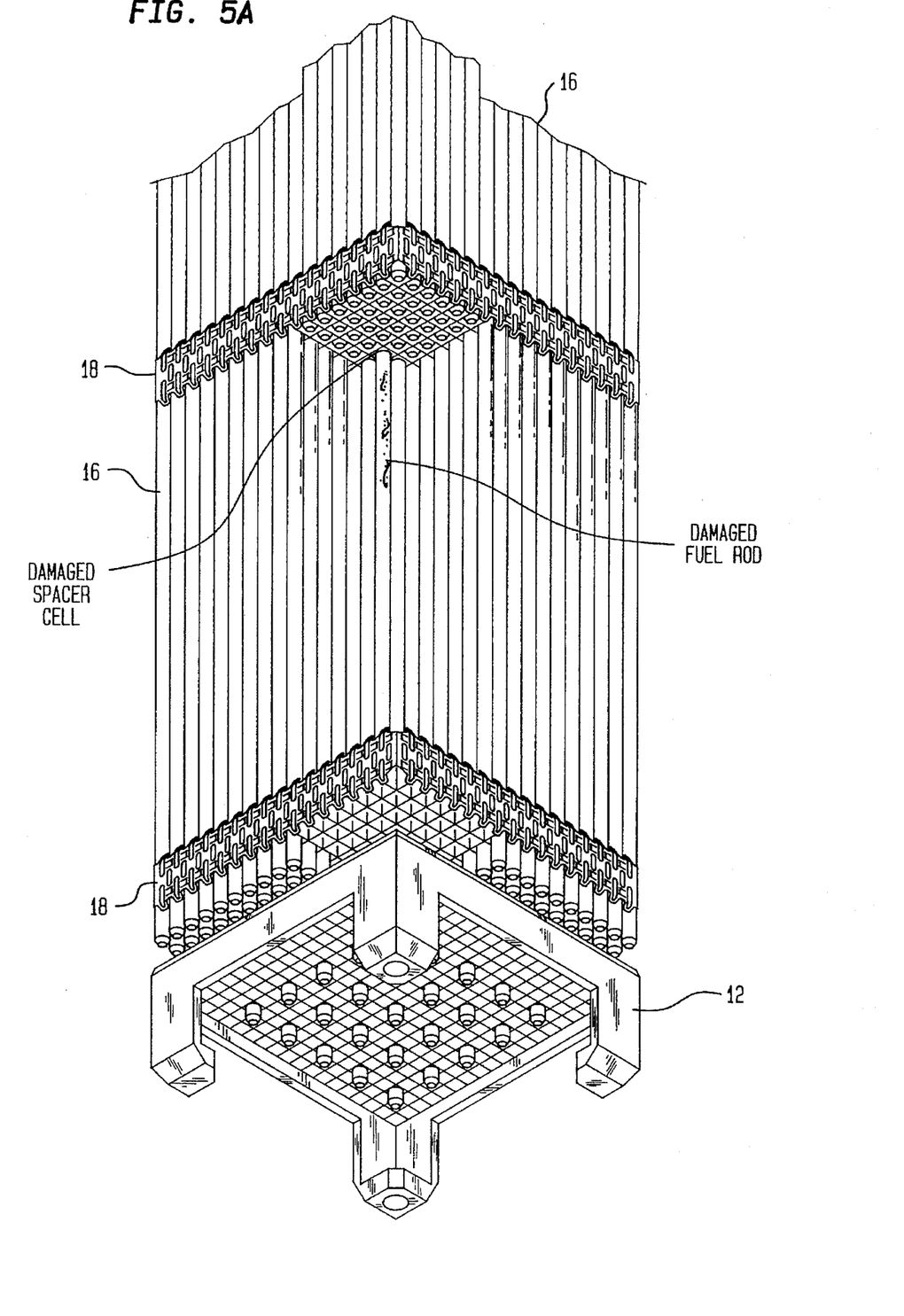
FIG. 5A is a perspective view looking up at a nuclear fuel rod assembly having a damaged fuel rod and a damaged spacer cell with several fuel rods pulled upwards to slide them through the damaged spacer to expose an underside of the damaged spacer.
Figure 5B:
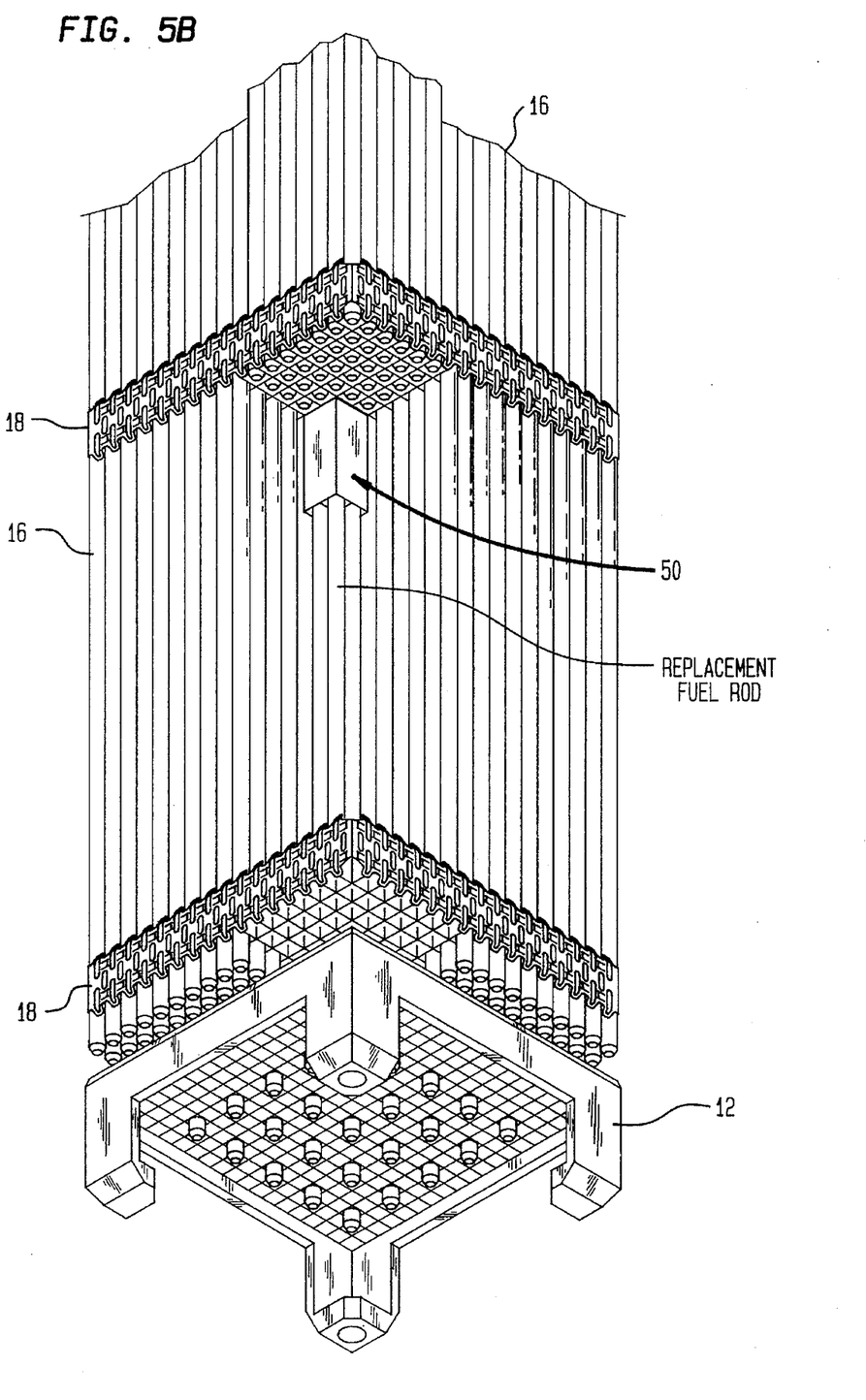
FIG. 5B is a perspective view of the nuclear fuel rod assembly depicted in FIG. 5A with a replacement fuel rod and repair grid installed in accordance with the method of the present invention.

FIGS. 5A and 5B show the nuclear fuel rod assembly with a damaged fuel rod and a damaged spacer cell before and after the replacement of the damaged fuel rod and the positioning of the repair grid. (The fuel assembly in FIGS. 5A and 5B does not show the guide tubes for clarity of illustration.)

One advantage of the present invention over prior art repair methods and apparatuses is that since the present invention utilizes approved and licensed spacer designs which is substantially duplicated by the repair grid, the repair of damaged fuel assemblies can be more easily accomplished and licensed.

While the foregoing description and drawings represent the preferred embodiments of the present invention, it will be apparent to those skilled in the art that various changes and modifications may be made therein without departing from the true spirit and scope of the present invention.

I claim:

1. In a nuclear fuel rod assembly including a plurality of spaced apart grid spacers comprising an arrangement of a first plurality of grid strips intersecting each other to form a first plurality of spacer cells through which fuel rods extend and for maintaining the fuel rods in a predetermined position within said assembly, and an upper tie plate located at the top of said assembly, a method of repairing a nuclear fuel rod assembly having a grid spacer having a damaged spacer cell, by inserting a repair grid into the fuel rod assembly at an underside of the damaged grid spacer, comprising the steps of:

(a) removing the upper tie plate from said nuclear fuel rod assembly;

(b) pulling a fuel rod passing through the damaged spacer cell upward to slide it through the grid spacer having the damaged spacer cell to expose an underside of the damaged grid spacer;

(c) pulling a plurality of fuel rods at least some of which are adjacent to the fuel rod formerly passing through the damaged spacer cell upward to slide them through the grid spacer having the damaged spacer cell to further expose the underside of the damaged grid spacer;

(d) positioning a repair grid into the fuel rod assembly and holding said repair grid against the underside of the damaged grid spacer at the damaged spacer cell, said repair grid comprising a second plurality of grid strips intersecting each other to form a second plurality of spacer cells for maintaining the fuel rod which passes through the damaged spacer cell and at least some of the fuel rods adjacent to the fuel rod which passes through the damaged spacer cell in the predetermined position within said assembly, said repair grid substantially duplicating a portion of the arrangement of the first plurality of grid strips intersecting each other to form the first plurality of spacer cells of the grid spacer having the damaged spacer cell;

(e) sliding the fuel rod formerly passing through the damaged spacer cell back into the damaged spacer cell and grid spacer cells formerly occupied by it and into a corresponding one of the second plurality of spacer cells of the repair grid to support in the repair grid said fuel rod passing through the damaged spacer cell;

(f) sliding the plurality of fuel rods at least some of which are adjacent to the fuel rod passing through the damaged spacer cell back into the spaces and grid spacer locations formerly occupied by them and into respective corresponding ones of the second plurality of spacer cells of the repair grid to support the plurality of fuel rods at least some of which are adjacent to the fuel rod passing through the damaged spacer cell; and (g) replacing the upper tie plate to said fuel rod assembly.

2. The method of repairing a nuclear fuel rod assembly as in claim 1 wherein each of the first plurality of grid strips of the grid spacers comprises a first pair of contacting strips and wherein each of the second plurality of grid strips of the repair grid comprises a second pair of contacting strips substantially duplicating a portion of the arrangement of the first pair of strips and wherein the repair grid has an outermost wall comprising a flat strip.

3. The method of repairing a nuclear fuel rod assembly as in claim 1 wherein each of the first plurality of grid strips of the grid spacers comprises a first pair of contacting strips and further includes a perimeter strip secured to the ends of each of the first pair of contacting strips and surrounding the fuel rods and wherein each of the second plurality of grid strips of the repair grid comprises a second pair of contacting strips and further includes a perimeter strip on an outermost wall of the repair grid substantially duplicating a portion of the arrangement of the first pair of metal strips and wherein the repair grid has a second outermost wall comprising a flat strip.

4. The method of repairing a nuclear fuel rod assembly as in claim 1 wherein the damaged spacer cell of the grid spacer further includes an arrangement of a first plurality of dimples contacting the fuel rod passing therethrough and wherein the second plurality of spacer cells of the repair grid further includes an arrangement of a second plurality of dimples substantially duplicating a portion of the arrangement of the first plurality of dimples.

5. The method of repairing a nuclear fuel rod assembly as in claim 1 wherein the damaged spacer cell of the grid spacer further includes an arrangement of a first plurality of springs contacting the fuel rod passing therethrough and wherein the second plurality of spacer cells of the repair grid further includes an arrangement of a second plurality of springs substantially duplicating a portion of the arrangement of the first plurality of springs.

6. The method of repairing a nuclear fuel rod assembly as in claim 4 wherein the damaged spacer cell of the grid spacer further includes an arrangement of a first plurality of dimples contacting the fuel rod passing therethrough and wherein the second plurality of spacer cells of the repair grid further includes an arrangement of a second plurality of dimples substantially duplicating a portion of the arrangement of the first plurality of dimples.

7. In a nuclear fuel rod assembly including a plurality of spaced apart grid spacers comprising an arrangement of a first plurality of grid strips intersecting each other to form a first plurality of spacer cells through which fuel rods extend and for maintaining the fuel rods in a predetermined position within said assembly, and an upper tie plate located at the top of said assembly, a method of repairing a nuclear fuel rod assembly having a damaged fuel rod extending through a grid spacer having a damaged spacer cell, by replacing the damaged fuel rod with a replacement fuel rod and by inserting a repair grid into the fuel rod assembly at an underside of the damaged grid spacer, comprising the steps of:

(a) removing the upper tie plate from said nuclear fuel rod assembly;

(b) pulling the fuel rod passing through the grid structure having the damaged spacer cell upward to slide it out of the grid spacer having the damaged spacer cell and out of the other ones of said grid spacers and ultimately out of said fuel rod assembly;

(c) pulling a plurality of fuel rods at least some of which are adjacent to the fuel rod formerly passing through the damaged spacer cell upward to slide them through the grid spacer having the damaged spacer cell to expose the underside of the damaged grid spacer;

(d) positioning a repair grid into the fuel rod assembly and holding said repair grid against the underside of the damaged grid spacer at the damaged spacer cell, said repair grid comprising a second plurality of grid strips intersecting each other to form a second plurality of spacer cells for maintaining a replacement fuel rod which passes through the damaged spacer cell and at least some of the fuel rods adjacent to the fuel rod which passes through the damaged spacer cell in the predetermined position within said assembly, said repair grid substantially duplicating a portion of the arrangement of the first plurality of grid strips intersecting each other to form the first plurality of spacer cells of the grid spacer having the damaged spacer cell;

(e) sliding the replacement fuel rod into the space and first plurality of spacer cell locations formerly occupied by said damaged fuel rod and into a corresponding one of the second plurality of spacer cells of the repair grid to support in the repair grid the replacement fuel rod;

(f) sliding the plurality of fuel rods at least some of which are adjacent to the fuel rod formerly passing through the damaged spacer cell back into the spaces and grid spacer locations formerly occupied by them and into respective corresponding ones of the second plurality of spacer cells of the repair grid to support the plurality of fuel rods at least some of which are adjacent to the fuel rod passing through the damaged spacer cell; and (g) replacing the upper tie plate to said fuel rod assembly.

8. The method of repairing a nuclear fuel rod assembly as in claim 7 wherein each of the first plurality of grid strips of the grid spacers comprises a first pair of contacting strips and wherein each of the second plurality of grid strips of the repair grid comprises a second pair of contacting strips substantially duplicating a portion of the arrangement of the first pair of strips and wherein the repair grid has an outermost wall comprising a flat strip.

9. The method of repairing a nuclear fuel rod assembly as in claim 7 wherein each of the first plurality of grid strips of the grid spacers comprises a first pair of contacting strips and further includes a perimeter strip secured to the ends of each of the first pair of contacting strips and surrounding the fuel rods and wherein each of the second plurality of grid strips of the repair grid comprises a second pair of contacting strips and further includes a perimeter strip on an outermost wall of the repair grid substantially duplicating a portion of the arrangement of the first pair of metal strips and wherein the repair grid has a second outermost wall comprising a flat strip.

10. The method of repairing a nuclear fuel rod assembly as in claim 7 wherein the damaged spacer cell of the grid spacer further includes an arrangement of a first plurality of dimples contacting the fuel rod passing therethrough and wherein the second plurality of spacer cells of the repair grid further includes an arrangement of a second plurality of dimples substantially duplicating a portion of the arrangement of the first plurality of dimples.

11. The method of repairing a nuclear fuel rod assembly as in claim 7 wherein the damaged spacer cell of the grid spacer further includes an arrangement of a first plurality of springs contacting the fuel rod passing therethrough and wherein the second plurality of spacer cells of the repair grid further includes an arrangement of a second plurality of springs substantially duplicating a portion of the arrangement of the first plurality of springs.

12. The method of repairing a nuclear fuel rod assembly as in claim 11 wherein the damaged spacer cell of the grid spacer further includes an arrangement of a first plurality of dimples contacting the fuel rod passing therethrough and wherein the second plurality of spacer cells of the repair grid further includes an arrangement of a second plurality of dimples substantially duplicating a portion of the arrangement of the first plurality of dimples.

* * * * *